Aug. 3, 1954                 J. T. DEARSTYNE                 2,685,237
         CAMERA HAVING ROTATABLE LENS, SHUTTER, AND FINDER MOUNT
                          Filed Nov. 27, 1951
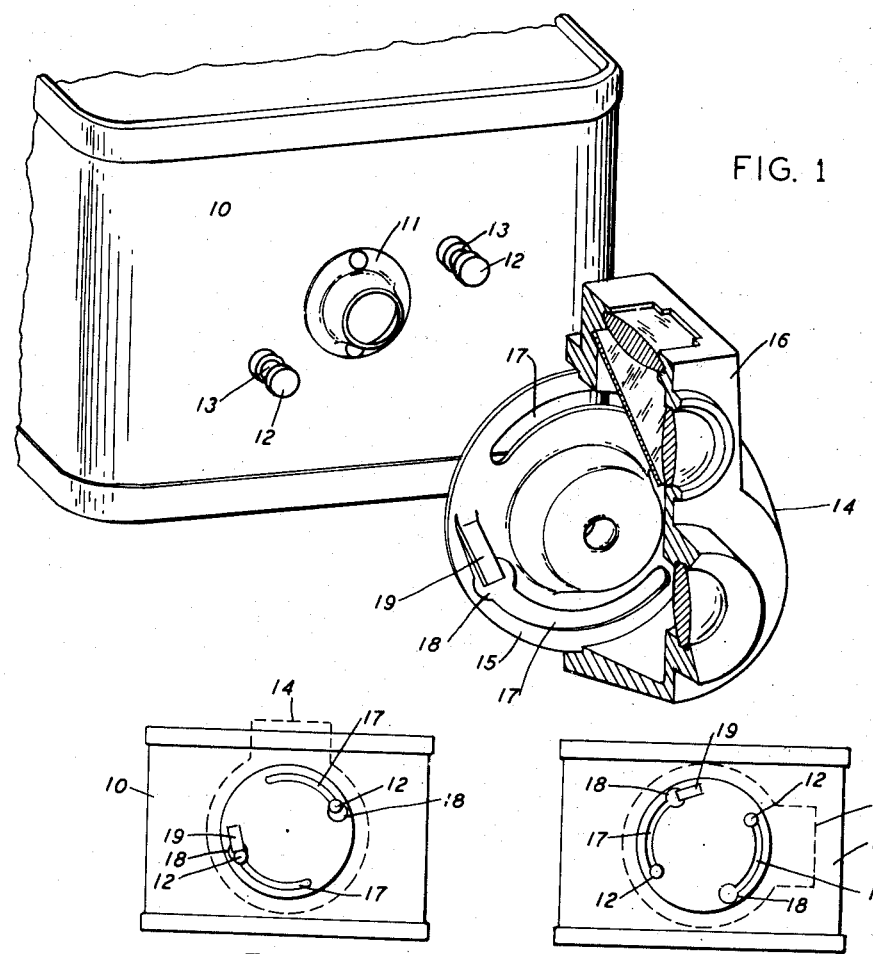
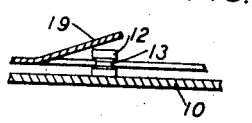
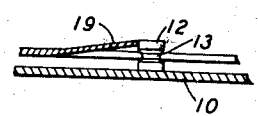
INVENTOR
JOHN T. DEARSTYNE
ATTORNEYS Patented Aug. 3, 1954

2,685,237

UNITED STATES PATENT OFFICE 2,685,237

CAMERA HAVING ROTATABLE LENS, SHUTTER, AND FINDER MOUNT

John T. Dearstyne, Binghamton, N. Y., assignor to General Aniline & Film Corporation, New York, N. Y., a corporation of Delaware Application November 27, 1951, Serial No. 258,329

2 Claims. (Cl. 95—11)

This invention relates to new and useful improvements in means for attaching a shutter, lens and finder unit to a camera body.

Briefly described, the invention comprises a camera divided into two sections, one section of which constitutes the camera body and the other section comprising a housing containing the shutter, finder and lens. Associated with the front wall of the camera body is a pair of grooved studs for mounting the second section. The second section is provided with a pair of slots to receive the aforesaid studs and means are provided to cooperate with the studs to assemble the two sections against separation. The slots further serve to permit 90° rotation of the second section for vertical picture composition.

Thus, the invention provides for a relatively simple, efficient and economically manufactured unit which can be quickly and easily applied to a camera.

A further advantage of the invention is the provision of a simple and efficient means whereby the attachment to and removal of the unit from the camera can be accomplished with a minimum effort for replacing a faulty unit, repairs or the like. A further advantage of the invention resides in the provision of means for mounting a shutter, lens and finder unit to a camera body in such manner whereby the unit can be rotated 90°.

Further and more specific purposes, features and advantages will be apparent from the following description pointed out in particularity in the appended claims, and taken in connection with the accompanying drawing, which illustrates a preferred embodiment, and in which:

Figure 1 is a perspective view of the two main sections of the camera;

Figure 2 is a schematic view showing the position of the housing unit for horizontal picture composition.

Figure 3 is a similar view with the housing unit rotated 90° for vertical picture composition;

Figures 4 and 5 are detail views showing the manner of assembling the two sections.

Referring to the drawing, numeral 10 indicates the camera body having a fitting 11 surrounding the usual light opening. A pair of assembly studs 12 are suitably secured to the camera body on opposite sides of the fitting. Each stud is grooved at 13 for a purpose to be described.

The detachable unit indicated by the numeral 14 comprises a shutter base plate 15, suitably fastened to the finder and lens housing 16. The shutter base plate 15 is provided with a pair of diameterically opposed slots 17 terminating at one end in enlarged circular openings 18. The openings 18 are of such size as to permit entry of the studs 12 and the slots 17 are proportioned to received the grooved portions 13. An integrally formed locking tab 19 is struck out of the shutter plate to permit entry of the assembly studs and when returned to the plane of the shutter plate, prevent removal of the studs.

Assembly of the two units is accomplished by engaging the assembly studs into the large openings of the slots and turning slightly to the position illustrated in Figure 2, whereupon the edges of the slots are contained in the grooves of the studs. The locking tab 19 can now be bent to the plane of the stud head by inserting a flat bent type tool through the housing aperture necessary for the shutter actuating lever (not shown). The housing is thereby prevented from removal but can be rotated clockwise to provide the association illustrated in Figure 3 for vertical picture composition. The front housing can be readily removed by inserting a flat tool under the tab 19 and raising said tab sufficiently to allow the head of the stud to pass underneath.

While the invention has been described in detail and with respect to a present preferred form thereof, it will be readily apparent that minor changes in the details of construction may be made without departing from the spirit and scope of the invention in its broadest aspects. Hence, it is desired to cover any and all forms of the invention which may come within the language or scope of any one or more of the appended claims.

I claim:

1. In combination, a camera having an apertured lens supporting wall, means for attaching a shutter, lens and finder unit to said wall, said means comprising a pair of grooved studs mounted to said wall on opposite sides of said lens opening, said shutter, lens and finder unit having a base plate, a pair of oppositely disposed openings in said plate for receiving said studs, and diametrically opposed slots extending from said openings permitting rotation of said unit, and means for locking said unit to the wall of the camera comprising a strip extending from said plate forming a tab partially covering said opening and adapted to be pressed flush with said plate and thereby engaging the grooved portion of said studs.

2. In combination, a camera having an apertured lens supporting wall, means for attaching a shutter, lens and finder unit to said wall, said means comprising a pair of grooved studs disposed on opposite sides of said lens aperture, said shutter, lens and finder unit having a base plate, a pair of oppositely disposed openings in said plate for receiving said studs, and diametrically disposed concentric slots extending from each of the openings of such width as to receive the grooved portions of the stud to permit rotation of the unit, and means for locking the unit to the camera wall comprising a tab punched out of said plate extending therefrom, said tab being adapted to be pressed flush with said plate and partially closing said opening whereby said unit is free to rotate within the limits of said slots engaging said studs.

References Cited in the file of this patent

UNITED STATES PATENTS

| Number | Name | Date |
|---|---|---|
| 1,818,461 | Caps | Aug. 11, 1931 |

FOREIGN PATENTS

| Number | Country | Date |
|---|---|---|
| 381,704 | Germany | Sept. 24, 1923 |
| 798,215 | France | Mar. 2, 1936 |